United States Patent Office 3,492,355
Patented Jan. 27, 1970

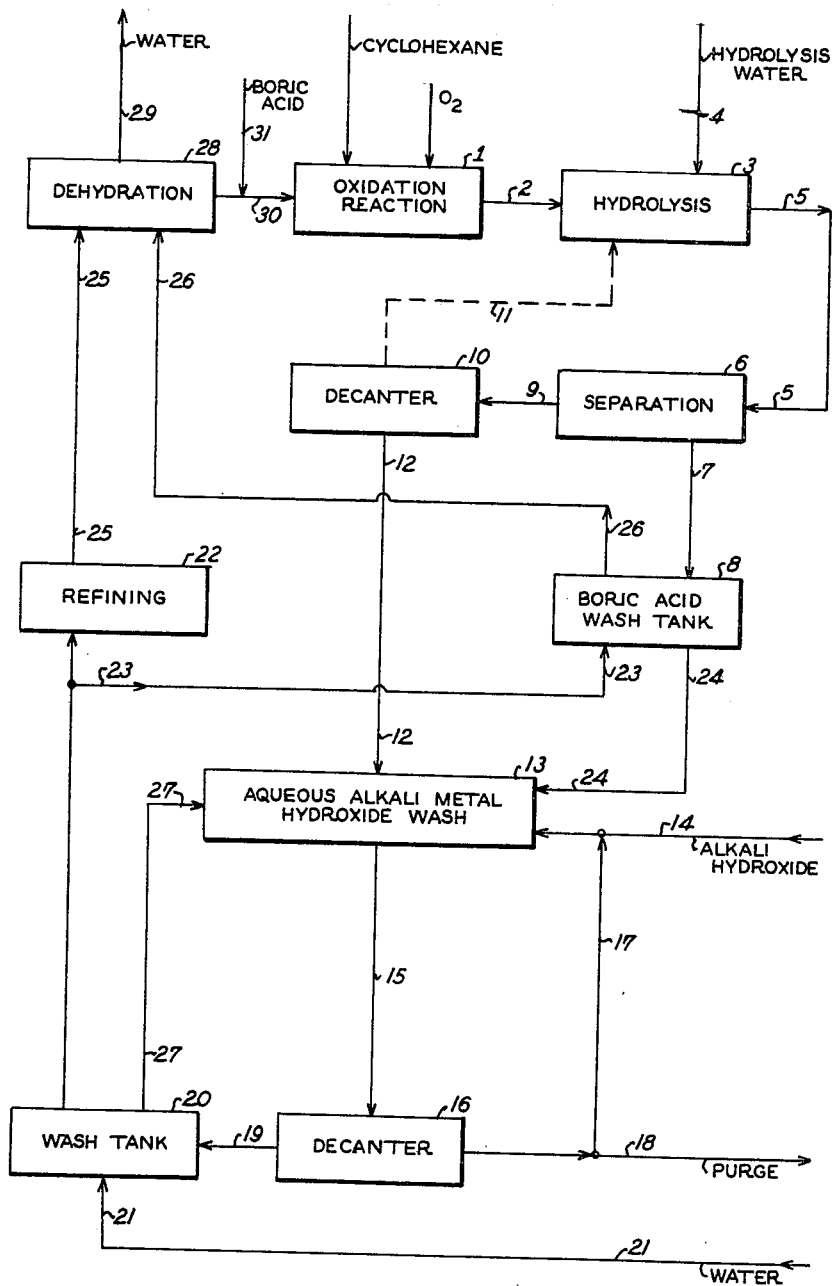

3,492,355
PROCESS FOR THE OXIDATION OF HYDROCARBONS IN THE PRESENCE OF BORIC ACID ADDITIVES
Harry Olenberg, Bronx, N.Y., and Jack B. Feder, Dumont, N.J., assignors to Halcon International, Inc., a corporation of Delaware
Continuation-in-part of application Ser. No. 205,187, June 26, 1962. This application May 12, 1966, Ser. No. 549,682
Int. Cl. C07c 27/12, 27/26
U.S. Cl. 260—586                    1 Claim

ABSTRACT OF THE DISCLOSURE

The present invention relates to the oxidation of hydrocarbon such as cyclohexane in the presence of boric acid additives and is specifically directed to the reduction in certain impurities in the recycle streams to the oxidation.

---

This application is a continuation-in-part of our copending application Ser. No. 205,187 filed June 26, 1962, now abandoned.

This invention relates to the recovery and treatment of boron compounds utilized in hydrocarbon oxidation reactions. More specifically, this invention teaches a process for treating boron compounds previously used in hydrocarbon oxidation so as to permit their effective use in subsequent oxidation and to the subsequent oxidation using previously used boron values.

Hydrocarbons have been oxidized in the presence of boron compound because of their influence on the course of the oxidation reaction. For example, in the oxidation of cyclohexane with a gas containing molecular oxygen higher overall yields of the cyclohexanol plus cyclohexanone are obtained. This reaction and others are more fully described in U.S. patent application Ser. No. 85,987, filed Jan. 31, 1961, and recently issued U.S. Patent 3,243,449.

The reaction product from the oxidation contains boron esters of the corresponding alcohol. By the addition of water, the ester is hydrolyzed, thereby forming boric acid and free alcohol.

The alcohol is removed in the organic phase and the boric acid is removed in the aqueous phase which forms. The aqueous phase results since generally water in excess of the stoichiometric amount is used for hydrolysis. If a large enough excess of water is employed, all the boric acid may be dissolved in the aqueous phase; where less water is employed a portion of the boric acid precipitates as a solid. Where the boric acid is wholly or predominantly in solution, it is desirable to separate and recover the bulk of the boric acid by evaporation, crystallization, and filtration or centrifugation.

Naturally, it is desirable to recover and recycle these boron compounds to subsequent oxidations in order to increase the economic attractiveness of the process. However, it has been found, quite unexpectedly, that the recycle boron compounds are not effective, since they either prevent the reaction from initiating, even in the presence of known initiators, or the selectivities to the desired products are lowered.

Another problem encountered when boric acid is recycled to the oxidation step is the formation of solid materials resembling coffee grounds in the oxidation reactor. These undesirable byproducts have been identified as extremely complex, high molecular weight organic acids and esters. These "coffee grounds" have interfered with the operation of the oxidation reactor. They coat the surface of the reactor and cause loss in the selectivity of the oxidation to the desired products.

The formation of undesirable byproducts and the depression of oxidation selectivity is caused by certain byproducts of the oxidation which are recycled to the oxidation.

More specifically, it has been found that the "coffee grounds" formation and depression of oxidation selectivity can be substantially decreased if the oxidation reactor feed contains less than certain critical amounts of adipic acid, glutaric acid and/or e-hydroxycaproic acid. It has been found that if the amount of adipic, glutaric and e-hydroxycaproic acids present is at a level of the order of 1.2% carbon or higher based on dry boric acid, the oxidation is inhibited and "coffee grounds" are formed. Better results are obtained if the amount of the foregoing acids on dry recycle boric acid is reduced to about 0.9% carbon or less and a normal oxidation occurs if the acid content is reduced to about 0.5% or less carbon.

The best technique for removing the troublesome acids from the reactor feed stream is to remove them from recycle boric acid. The boric acid is washed with a suitable wash liquid until the impurities are reduced to a suitable level.

In accordance with this invention, it has been found that the recycle cake can be successfully utilized if subjected to an appropriate washing treatment until the content of the above impurities is reduced to 0.9% or lower based on dry boric acid. Solvents used in the cake washing are: (1) water, (2) cyclohexane, (3) cyclohexanol and/or cyclohexanone, (4) purified cyclohexane-oil.

While each of these streams may be effectively used, certain ones are more desirable for one or more reasons.

Purified cyclohexane-oil can be used. The purification can be accomplished by either caustic washing or distillation. This stream has been found very efficient in removing impurities. The caustic wash purification is particularly preferred, since the boric acid washings may be conveniently recycled to the caustic wash step, thereby permitting the removal of all impurities at one point in the process.

Washing with cyclohexanol and/or cyclohexanone is the most efficient in removing impurities. However, such a stream is of great value, being the very products sought by the reaction, and is therefore less attractive as a wash liquor than the cyclohexane-oil.

Cyclohexane can be successfully utilized as a wash though it is less efficient for purifying the boric acid cake. However, this stream is readily available, being recovered during the distillation of the cyclohexane-oil.

Water is somewhat better than cyclohexane in its ability to remove impurities from the cake. It is readily available in the process, since it is needed both for hydrolysis and washing of the cyclohexane-oil and is least expensive. Preferably, the water wash is an aqueous boric acid solution to surpress dissolving boric acid cake.

To more fully describe the instant invention, attention is directed to the accompanying figure, which describes an embodiment of the invention. Cylchohexane and oxygen are introduced into an oxidation reaction along with meta-boric acid. The reaction is carried out as described in the aforementioned application and an effluent containing boric esters, cyclohexane oxidation products and unreacted cyclohexane pass via line 2 to hydrolysis tank 3. Water is added via line 4 to hydrolyze the borate ester thereby precipitating boric acid. The boric acid slurry plus the cyclohexane-oil pass via line 5 of the boric acid separator 6. This separator may be a centrifuge or filtering device or similar solid-liquid separator. The solid boric acid cake containing entrained cyclohexane-oil and impurities passes via line 7 to washing zone 8. Alternatively, if a centrifuge is employed the boric acid may be washed therein. The cyclohexane-oil passes via line 9 to decanter 10 to remove any water present. The water is recycled via line 11 to hydrolyzing tank 3. If no water is present, this step may be omitted. The cyclohexane-oil, essentially free of water, passes to wash tank 13 via line 12 wherein it is contacted with an aqueous alkaline solution, for example, aqueous sodium hydroxide introduced via line 14. The cyclohexane-oil and wash liquid passes via line 15 to decanter 16. The aqueous alkaline solution is withdrawn from the decanter 16 and recycled via line 17. A purge stream 18 is withdrawn as required. The alkaline washed cyclohexane-oil leaves the decanter 16 through line 19 and is water washed in tank 20 until neutral. Water is introduced into tank 20 via line 21. The cyclohexane-oil stream leaving the tank 20 passes to refining column 22 to separate the oxygenated reaction products from the unreacted cyclohexane. A split stream of the washed cyclohexane-oil passes via line 23 to the boric acid washing tank 8. The wash effluent from tanks 8 to 20 pass via lines 24, 27, respectively to the aqueous alkaline solution wash tank 13. The oil washed boric acid passes from the wash tank 8 to the dehydration zone 28 via line 26 wherein it is combined with the recycle cyclohexane leaving the refining column 22 via line 25. The boric acid in dehydration zone 28 is dehydrated and water removed via line 29. The dehydrated boron compound, now in the form of meta boric acid, and the cyclohexane passes back into the oxidation reactor 1 through line 30. Make up boric acid, if needed, is introduced via line 31.

Many variations of the above scheme can be employed without departing from the spirit of the invention. For example, if desired the alkaline metal hydroxide may be used on a once through operation rather than recycled. Or acid may be used to neutralize the caustic washed cyclohexane-oil rather than water washes.

Also relatively large amounts of water can be employed in the hydrolysis such that the boric acid formed in the hydrolysis is separated as an aqueous solution from the organic solution. The aqueous boric acid solution can be treated for crystallization and recovery of boric acid cake as by evaporative crystallization techniques.

While, as stated previously, cyclohexane may be used as a wash, cyclohexane-oil is perferred over cyclohexane. The latter contains from 4 to 50% of oxygenated materials, e.g., cyclohexanol, preferably, from 5 to 20%.

In the particularly preferred embodiment of the invention, the boric acid washings are subject to purification along with the cyclohexane-oil. This procedure gives process advantages, namely, the impurities in the boric acid washings are removed at the same point as the impurities in the cyclohexane-oil, and the valuable constituents in the washings, i.e., cyclohexane and oxygenated products are recovered. Hence, when the cyclohexanol-oil is alkaline washed, the boric acid washings are recycled to the alkaline wash step. On the other hand, when the cyclohexane-oil is purified by distillation, the boric acid washings are passed to the distillation column.

In the boric acid wash from 0.5 to 25.0 parts by weight of cyclohexane-oil are used per part of boric acid cake, preferably 1.0 to 2.0. The lower limit of these ranges is set by the minimum amount of oil needed to insure adequate removal of impurities; the upper limit is set by the need to prevent superfluous and uneconomical recycle of the cyclohexane-oil. Similar amounts are employed when cyclohexanol and/or cyclohexanone are employed as the wash liquor.

In the alkline wash step of the process numerous reagents may be used. Desirable, aqueous solutions of alkali meta hydroxides, e.g., sodium and potassium hydroxides are employed. Broadly, the sodium hydroxide concentration of the washing solution should be between 0.5% and 50% preferably, 5% to 20%. Other reagents which may be used, but with somewhat less efficiency, include aqueous solutions of organic amines and alkaline earth metal hydroxides. Where these other aqueous alkaline solutions are employed a mole concentration equivalent to the percentage concentrations stated for sodium hydroxide is used. From 0.01 to 100 parts by weight of wash solutions should be employed per part of cyclohexane-oil, preferably 0.25 to 0.1 part. The amount of actual caustic present in the wash solution should be in excess of the stoichiometric quantity of acids plus esters present in the cyclohexane-oil to be washed. This procedure results in the full benefits of yield enhancement due to ester cleavage.

When water or cyclohexane is used as the wash usually from 2 to 4 parts by weight of wash is used per part of boric acid cake. Since these streams are not quite as effective as the others mentioned, generally larger quantities are needed. The wash may be made more efficient by employing several washes with portions of the wash liquid. Such variation are well known to those skilled in the art and need not be detailed here.

While specific quantities of wash liquids are set forth, it is to be understood that greater or lesser amounts e.g., 0.5 to 50 parts by weight per part of boric acid can be employed depending on the degree of contamination of the boric acid cake to reduce the impurities to the specified level. The amount of contamination with adipic acid, glutaric acid, and/or e-hydroxycaproic acid appears to be directly related to the decrease in selectivity in the oxidation process; and hence, the selectivity requirement is the ultimate factor in determining the amount of wash liquor employed, or, for that matter, which of the recited streams should be used. Furthermore, as the cake is recycled again and again, it may be necessary to subject it to a more thorough washing to achieve desired results. The amount of make up boric acid added to the process is also instrumental in determining the wash employed.

EXAMPLE 1

The oxidation reactor is charged with 3100 parts of cyclohexane and 248 parts meta boric acid, pressured to 125 p.s.i.g., and heated to 165° C. The charge is oxidized using 8% oxygen, 92% nitrogen until 2.7 gram moles of oxygen are reacted. The reactor is emptied and the effluent hydrolyzed using an amount of water corresponding to theoretical requirements. The hydrolysis slurry is filtered to remove the boric acid cake. Five runs are performed under these conditions. The boric acid cake obtained from these runs is over dried to a constant weight and treated in the manner described below. The impurities on the cake are reported as percent weight of carbon.

Run No. 1.—No wash was performed on this run. The percent impurities on the cake is about 1%.

Run No. 2.—Each part of the dried cake is washed with two parts cyclohexane obtained from distillation of the cyclohexane-oil. The carbon content is about 0.9%.

Run No. 3.—Each part of the cake is washed with two parts of water. Analysis shows that 0.5% impurity remains.

Run No. 4.—A mixture of cyclohexanol and cyclohexanone obtained from distillation of the cyclohexane-oil is used to wash the cake in a ratio of 2.1. The impurities are reduced to 0.18%.

Run No. 5.—The cake is washed with two parts of purified cyclohexane-oil per part of cake. The oil, separated from the hydrolyzer, is purified by treatment with a 9.45% aqueous sodium hydroxide solution at a ratio of 0.8 part of cyclohexane-oil per part of solution for 60 minutes at 70° C. The caustic phase is separated after agitation and the cyclohexane-oil neutralized. Analysis of the washed boric acid cake shows the presence of 0.23% impurities.

The above data clearly shows the efficacy of the various washes. Particularly efficient are the treatments with the purified cyclohexane-oil and the cyclohexanol-cyclohexanone mixture.

EXAMPLE 2

The boric acid cakes obtained after washing as described in Example 1 are recycled to subsequent oxidations. Between each recycle the cakes are washed again in the same manner. The conditions in each oxidation are the same as described in the previous example. The following table shows the selectivity to cyclohexanol and cyclohexanone with the fresh cake and subsequent recycle runs.

TABLE 1

| | | Percent | | |
|---|---|---|---|---|
| Run No. Wash | Fresh cake | Selectivity 1st recycle | Selectivity 2nd recycle | Selectivity 3rd recycle |
| 1 ----- None ---------------- | 89 | 72 | No oxidation | |
| 2 ----- Cyclohexane --------- | 89 | 87 | 85 | 84 |
| 3 ----- Water --------------- | 89 | 87 | 86 | 85 |
| 4 ----- Cyclohexanol and Cyclohexanone. | 89 | 89 | 88 | 88 |
| 5 ----- Purified Cyclohexane-oil. | 89 | 88 | 87 | 87 |

The above data clearly shows that when no wash is employed the reaction selectivity falls rapidly, and after one recycle the reaction fails to initiate. Runs 2 and 3 show a water or a cyclohexane wash results in the maintenance of high degrees of selectivity, with only a slight decline from one recycle to the next. Runs 4 and 5 show the most efficient wash streams. These streams represent the preferred embodiment of the instant invention. A comparison of the two examples shows a close correlation between the impurity content on the cake and the effect on selectivity.

EXAMPLE 3

An oxidant reactor is charged with 500 parts of cyclohexane and 84 parts of ortho boric acid (containing 1.2% carbon by weight as adipic acid). Dehydration is effected under nitrogen at 125 p.s.i.g. and 140° C. until only trace water is detected in the separator (this usually involves a period of less than 5 hours). The boric acid is thus converted to meta boric acid. The temperature is then raised to 165° C. and the charge is oxidized using 10% oxygen and 90% nitrogen. The oxygen in the vent decreases to about 7% and then rapidly levels off above 9%, indicating almost complete inhibition of oxidation.

Brown solids resembling "coffee grounds" are found in the reactor. So little oxidation is accomplished that selectivity is not measured.

EXAMPLE 4

One-hundred grams of the boric acid (containing 1.2% carbon by weight as adipic acid), employed in Example 3 is slurried for two hours at room temperature with 1 liter of saturated aqueous boric acid solution (this corresponds to about 4.5 liters of wash solution per pound of boric acid). The mixture is then filtered and additional solution is passed through the cake. This procedure results in boric acid containing less than 0.1% carbon by weight as adipic acid.

The reactor of Example 3 charged with 500 parts of cyclohexane and 85 parts of this washed boric acid. The run is made under the conditions described in Example 1. The oxidation is continued until 10 liters of oxygen react. The reactor is emptied and the effluent hydrolyzed with excess water at room temperature. The hydrolysis slurry is filtered to remove the boric acid, and the filtrate is separated into an aqueous phase and an organic phase.

The organic phase is subjected to caustic hydrolysis, employing 5% sodium hydroxide at 40° C. for 1 hour. After separation, the aqueous phase is neutralized with 6 N $H_2SO_4$ and added to a flask containing boric acid and the aqueous phase from the hydrolysis step.

The organic layer is neutralized to pH 7 with 0.2 N $H_2SO_4$. Once neutralized the aqueous phase is drained off and added to the flask containing the other aqueous solutions. The flask containing the aqueous solutions is prepared for steam stripping in order to recover oil from the aqueous phase. The stripped oil is added to the organic phase, and the mixture is distilled at atmospheric pressure in a 15-plate Oldershaw column to a pot temperature of 100° C.

The residue is subjected to a vacuum distillation at 150 mm. Hg to a pot temperature of 100° C. The residue is analyzed for cyclohexane, cyclohexanol and cyclohexanone and the aqueous phase is analyzed for carbon in order to determine its organic content.

The selectivity to the oxygenated products, i.e., cyclohexanol and cyclohexanone, is the same, within experimental error, as that obtained from a run employing virgin boric acid, i.e. boric acid which has not previously been used in an oxidation.

EXAMPLE 5

The reactor of Example 3 is charged with 500 parts of cyclohexane and 65.5 parts of boric acid (containing 1% carbon by weight as e-hydroxycaproic acid). The run was made under the conditions described in Example 1. The oxidation was severely inhibited and "coffee grounds" were found in the reactor.

EXAMPLE 6

The reactor of Example 3 is charged with 500 parts of cyclohexane and 82 parts of boric acid (containing 0.2% carbon by weight as e-hydroxycaproic). The run is made under the conditions described in Example 1. The oxidation is continued until 10 liters of oxygen react. The work-ups of the effluent is the same as that decribed in Example 2.

The selectivity to the oxygenated products, i.e., cyclohexanol and cyclohexanone, is the same, within experimental error, as that obtained from a run employing virgin boric acid.

EXAMPLE 7

The reactor of Example 3 is charged with 500 parts of cyclohexane and 74 grams of boric acid (containing 1% carbon by weight as glutaric acid). The run is made under the conditions described in Example 1. The oxidation is severely inhibited and "coffee grounds" are found in the reactor.

EXAMPLE 8

The reactor of Example 3 is charged with 500 parts of cyclohexane and 74 parts of boric acid (containing 9.4% carbon by weight as glutaric acid). The run is made under the conditions described in Example 1. The oxidation is continued until 10 liters of oxygen react. The workings of the effluent is the same as that described in Example 2.

The selectivity to the oxygenated products, i.e., cyclohexanol and cyclohexanone, is the same, within experimental error, as that obtained from a run employing virgin boric acid.

While the above example and discussion are specifically directed towards the oxidation of cyclohexane in the presence of meta boric acid, it is to be understood that many other reactants may be oxidized, and other boron compounds utilized. These other reactants and boron-containing compounds are more fully described in U.S. patent application Ser. No. 85,987, filed Jan. 31, 1961 and in U.S. Patent 3,243,449.

Generally an aqueous boric acid purge stream containing impurities is removed in order to prevent excessive impurities build up. Addtional borc acid values can be recovered by crystallizing boric acid from this purge stream. Where these crystals are recycled to the oxidation zone the content of the above specific impurities must be reduced such that amount of impurities based on all recycle boric acid does not exceed the above specified limits.

It will be understood that modification and variations may be affected without departing from the spirit of the invention.

What is claimed is:

1. The process which comprises removing a borate ester containing cyclohexane oxidation mixture from an oxidation zone, hydrolyzing said oxidation mixture, filtering solid boric acid from hte hydrolysis products, washing said solid boric acid with 0.5 to 50 parts by weight per part of boric acid of a liquid selected from the group consisting of cyclohexane, purified cyclohexane oxidation mixture, purified oxidation products of cyclohexane and water in order to reduce the amount of adipic acid, glutaric acid and hydroxy caproic acid contaminating the solid boric acid to less than 0.9% by weight expressed as carbon based on dry boric acid, passing the washed boric acid to a dehydration zone and to said oxidation zone.

References Cited

UNITED STATES PATENTS 3,232,704   2/1966   Helbig et al.

FOREIGN PATENTS 100,481   2/1962   Netherlands.

LEON ZITVER, Primary Examiner

G. A. SCHWARTZ, Assistant Examiner

U.S. Cl. X.R.

23—149; 260—631